United States Patent
Zhang

(10) Patent No.: US 10,970,718 B2
(45) Date of Patent: Apr. 6, 2021

(54) PAYMENT METHOD, APPARATUS AND DEVICE

(71) Applicant: Advanced New Technologies Co., Ltd., George Town (KY)

(72) Inventor: Shiqi Zhang, Hangzhou (CN)

(73) Assignee: Advanced New Technologies Co., Ltd., George Town (KY)

(*) Notice: Subject to any disclaimer, the term of this patent is extended or adjusted under 35 U.S.C. 154(b) by 0 days.

(21) Appl. No.: 16/893,255

(22) Filed: Jun. 4, 2020

(65) Prior Publication Data
US 2020/0302435 A1 Sep. 24, 2020

Related U.S. Application Data

(63) Continuation of application No. PCT/CN2019/072976, filed on Jan. 24, 2019.

(30) Foreign Application Priority Data

Mar. 16, 2018 (CN) .......................... 201810220318.9

(51) Int. Cl.
*G06Q 20/38* (2012.01)
*G06Q 20/40* (2012.01)
(Continued)

(52) U.S. Cl.
CPC ....... *G06Q 20/385* (2013.01); *G06F 16/9537* (2019.01); *G06Q 20/10* (2013.01);
(Continued)

(58) Field of Classification Search
CPC ....... H04L 9/32; H04L 9/3226; H04L 63/083; G06Q 20/38
See application file for complete search history.

(56) References Cited

U.S. PATENT DOCUMENTS

| | | | |
|---|---|---|---|
| 2011/0078031 A1* | 3/2011 | Mardikar | G06Q 20/202 705/17 |
| 2013/0122942 A1* | 5/2013 | Jun | G01S 5/16 455/457 |

(Continued)

FOREIGN PATENT DOCUMENTS

| | | |
|---|---|---|
| CN | 103400265 A | 11/2013 |
| CN | 104268746 A | 1/2015 |

(Continued)

OTHER PUBLICATIONS

O. Zolotukhin and M. Kudryavtseva, "Authentication Method in Contactless Payment Systems," 2018 International Scientific-Practical Conference Problems of Infocommunications. Science and Technology (PIC S&T), Kharkiv, Ukraine, 2018, pp. 397-400, doi: 10.1109/INFOCOMMST.2018.8632065. (Year: 2018).*

(Continued)

Primary Examiner — Jacob C. Coppola
(74) Attorney, Agent, or Firm — Seed IP Law Group LLP

(57) ABSTRACT

Implementations of the present specification disclose a payment method, apparatus, and device. In the case of face-to-face payment, the location information and the payment information are sent to the server through the terminal device of the first user, and the server generates a corresponding payment password and returns the corresponding payment password to the first user. The first user then forwards the payment password (for example, verbally, or forwarding using communication software, etc.) to the second user, and the second user then uploads the location and payment password of the second user to the server. The server performs matching or querying within a certain range based on the location of the second user, to determine whether a same payment password exists. If the matching or query is successful, payment is made.

20 Claims, 5 Drawing Sheets

(51) Int. Cl.
  *G06F 16/9537* (2019.01)
  *G06Q 20/10* (2012.01)
  *H04L 29/06* (2006.01)

(52) U.S. Cl.
  CPC ..... *G06Q 20/3829* (2013.01); *G06Q 20/4014* (2013.01); *G06Q 20/4015* (2020.05); *H04L 63/083* (2013.01); *H04L 63/107* (2013.01); *G06Q 2220/00* (2013.01)

(56) References Cited

U.S. PATENT DOCUMENTS

| | | | | |
|---|---|---|---|---|
| 2014/0053078 | A1* | 2/2014 | Kannan | H04W 4/023 |
| | | | | 715/748 |
| 2014/0310171 | A1* | 10/2014 | Grossman | G06Q 20/385 |
| | | | | 705/44 |
| 2016/0063498 | A1* | 3/2016 | Li | G06Q 20/405 |
| | | | | 705/44 |
| 2016/0132864 | A1* | 5/2016 | Barrese | G06Q 20/3224 |
| | | | | 382/190 |
| 2016/0283942 | A1 | 9/2016 | Chitragar et al. | |
| 2016/0321628 | A1* | 11/2016 | Xu | G06Q 20/12 |
| 2017/0262784 | A1 | 9/2017 | Lowery et al. | |
| 2017/0270528 | A1 | 9/2017 | Prakash et al. | |
| 2018/0130105 | A1* | 5/2018 | Tanaka | G06Q 30/0613 |
| 2020/0252745 | A1* | 8/2020 | Bellenger | G06Q 20/223 |

FOREIGN PATENT DOCUMENTS

| | | |
|---|---|---|
| CN | 104463575 A | 3/2015 |
| CN | 104657857 A | 5/2015 |
| CN | 105787728 A | 7/2016 |
| CN | 106959984 A | 7/2017 |
| CN | 107292612 A | 10/2017 |
| CN | 107578238 A | 1/2018 |
| CN | 108564373 A | 9/2018 |

OTHER PUBLICATIONS

International Search Report, dated Apr. 25, 2019, for International Application No. PCT/CN2019/072976, 2 pages.

* cited by examiner

PAYMENT METHOD, APPARATUS AND DEVICE

CROSS-REFERENCE TO RELATED APPLICATIONS

This patent application is a continuation of PCT Application No. PCT/CN2019/072976, filed on Jan. 24, 2019, which claims priority to Chinese Patent Application No. 201810220318.9, filed on Mar. 16, 2018, and entitled "PAYMENT METHOD, APPARATUS, AND DEVICE", which are incorporated herein by reference in their entirety.

BACKGROUND

Technical Field

The present specification relates to the field of computer technologies, and in particular, to electronic payment.

Description of the Related Art

With the development of technologies, mobile payment becomes increasingly popular.

In the existing technology, when a user makes mobile payment in a place such as a supermarket or a convenience store, the user usually presents a digital object identifier (DOI), for example, a bar code, a two-dimensional code, etc. to the payee, and the payee scans the DOI, so that the related payment information is uploaded to a server to complete the payment.

More other forms of payment schemes are needed to improve user experience.

BRIEF SUMMARY

Implementations of the present specification provide a payment method, apparatus, and device, to provide more payment schemes and improve user experience.

Based on this, implementations of the present specification provide a payment method, including: obtaining, by a first client, identification information of a first user, payment information, and a first geographical location of a local terminal device; sending the identification information of the first user, the payment information, and the first geographic location to a server, for the server to generate a payment password; and receiving the payment password returned by the server.

In addition, implementations of the present specification further provide another payment method, including: receiving, by a second client, an operation instruction of the user, and obtaining a payment password, where the payment password is generated by a server and sent to a first client; obtaining identification information of a second user and a second geographical location of a local terminal device of the second user; and sending the identification information of the second user, the second geographic location, and the payment password to the server.

In addition, implementations of the present specification further provide still another payment method, including: receiving, by a server, identification information of a first user, first geographic location, and payment information that are sent by a first client; generating and storing a payment password corresponding to the first geographical location, the identification information of the first user, and the payment information; sending the payment password to the first client; receiving identification information of a second user, a second geographic location, and the payment password that are sent by a second client; determining whether the first geographical location, the second geographical location, and the payment password meet a determined criterion; and in response to the determined criterion being met, obtaining identification information of a first user and the payment information corresponding to the payment password, and making payment by linking the identification information of the first user, the payment information corresponding to the payment password, and the received identification information of the second user.

Correspondingly, implementations of the present specification further provide a payment apparatus, including: an acquisition module, configured to obtain, by a first client, identification information of a first user, payment information, and a first geographical location of a local terminal device; a sending module, configured to send the identification information of the first user, the payment information, and the first geographic location to a server, for the server to generate a payment password; and a receiving module, configured to receive the payment password returned by the server.

In addition, implementations of the present specification provide another payment apparatus, including: an instruction receiving module, configured to receive, by a second client, an operation instruction of the user, and obtain a payment password, where the payment password is generated by a server and sent to a first client; an acquisition module, configured to obtain identification information of a second user and a second geographical location of a local terminal device of the second user; and a sending module, configured to send the identification information of the second user, the second geographic location, and the payment password to the server.

In addition, implementations of the present specification further provide still another payment apparatus, including: a receiving module, configured to receive, by a server, identification information of a first user, first geographic location, and payment information that are sent by a first client; a generation module, configured to generate and store a payment password corresponding to the first geographical location, the identification information of the first user, and the payment information; a storage module, configured to a correspondence between the first geographical location, the identification information of the first user, the payment information, and the payment password; a sending module, configured to send the payment password to the first client, where the receiving module is further configured to receive identification information of a second user, a second geographic location, and the payment password that are sent by a second client; a determining module, configured to determine whether the first geographical location, the second geographical location, and the payment password meet a determined criterion; and a payment module, configured to: in response to the determined criterion being met, obtain identification information of a first user and the payment information corresponding to the payment password, and make payment by linking the identification information of the first user, the payment information corresponding to the payment password, and the received identification information of the second user.

Correspondingly, implementations of the present specification further provide a payment device, including: a memory, configured to store a payment program; and a processor, configured to invoke the payment program in the memory to perform the following operations: obtaining, by a first client, identification information of a first user, payment information, and a first geographical location of a local terminal device; sending the identification information of the first user, the payment information, and the first geographic location to a server, for the server to generate a payment password; and receiving the payment password returned by the server.

In addition, implementations of the present specification further provide another payment device, including: a memory, configured to store a payment program; and a processor, configured to invoke the payment program in the memory to perform the following operations: receiving, by a second client, an operation instruction of the user, and obtaining a payment password, where the payment password is generated by a server and sent to a first client; obtaining identification information of a second user and a second geographical location of a local terminal device of the second user; and sending the identification information of the second user, the second geographic location, and the payment password to the server.

In addition, implementations of the present specification further provide still another payment device, including: a memory, configured to store a payment program; and a processor, configured to invoke the payment program in the memory to perform the following operations: receiving, by a server, identification information of a first user, first geographic location, and payment information that are sent by a first client; generating and storing a payment password corresponding to the first geographical location, the identification information of the first user, and the payment information; sending the payment password to the first client; receiving identification information of a second user, a second geographic location, and the payment password that are sent by a second client; determining whether the first geographical location, the second geographical location, and the payment password meet a determined criterion; and in response to the determined criterion being met, obtaining identification information of a first user and the payment information corresponding to the payment password, and making payment by linking the identification information of the first user, the payment information corresponding to the payment password, and the received identification information of the second user.

Correspondingly, implementations of the present specification further provide a non-volatile computer storage medium, where the storage medium stores computer executable instructions that are used to: obtain, by a first client, identification information of a first user, payment information, and a first geographical location of a local terminal device; send the identification information of the first user, the payment information, and the first geographic location to a server, for the server to generate a payment password; and receive the payment password returned by the server.

In addition, implementations of the present specification further provide another non-volatile computer storage medium, where the storage medium stores computer executable instructions that are used to: receive, by a second client, an operation instruction of the user, and obtain a payment password, where the payment password is generated by a server and sent to a first client; obtain identification information of a second user and a second geographical location of a local terminal device of the second user; and send the identification information of the second user, the second geographic location, and the payment password to the server.

In addition, implementations of the present specification further provide still another non-volatile computer storage medium, where the storage medium stores computer executable instructions that are used to: receive, by a server, identification information of a first user, first geographic location, and payment information that are sent by a first client; generate and store a payment password corresponding to the first geographical location, the identification information of the first user, and the payment information; send the payment password to the first client; receive identification information of a second user, a second geographic location, and the payment password that are sent by a second client; determine whether the first geographical location, the second geographical location, and the payment password meet a determined criterion; and in response to the determined criterion being met, obtain identification information of a first user and the payment information corresponding to the payment password, and make payment by linking the identification information of the first user, the payment information corresponding to the payment password, and the received identification information of the second user.

At least one technical solution provided in the implementations of the present specification can achieve the following beneficial effects:

In the case of face-to-face payment, the location information and the payment information are sent to the server through the terminal device of the first user, and the server generates a corresponding payment password and returns the corresponding payment password to the first user. The first user then forwards the payment password (for example, verbally, or forwarding using communication software, etc.) to the second user, and the second user then uploads the location and payment password of the second user to the server. The server performs matching or querying within a certain range based on the location of the second user, to determine whether a same payment password exists. If the matching or query succeeds, payment is made. According to the above solution, a payment method different from a code scanning payment is provided, which enriches a user' choices in making a payment face-to-face, and improves user experience.

DETAILED DESCRIPTION

To make the objectives, technical solutions, and advantages of the present application clearer, the following clearly and comprehensively describes the technical solutions of the present application with reference to specific implementations of the present application and corresponding accompanying drawings. Clearly, the described implementations are only some rather than all of the implementations of the present application. All other implementations obtained by a person of ordinary skill in the art based on the implementations of the present application without creative efforts shall fall within the protection scope of the present application.

In the existing technology, when a transfer payment is made between a user and a merchant, the transfer payment is mainly performed as follows: 1. the user presents a two-dimensional payment code, and the merchant scans the code for receiving a payment; 2. the user scans the payment code held by the merchant for making a payment. In other words, the current mainstream offline face-to-face payment is basically based on code scanning, and the payment method is relatively monotonic.

Implementations of the present specification provide a geographical location-based payment method. The first user creates a payment password and communicates the payment password to the second user. The second user only needs to access the user client, e.g., using a terminal device, and enter the payment password through the user client to complete the payment.

Figure 1:
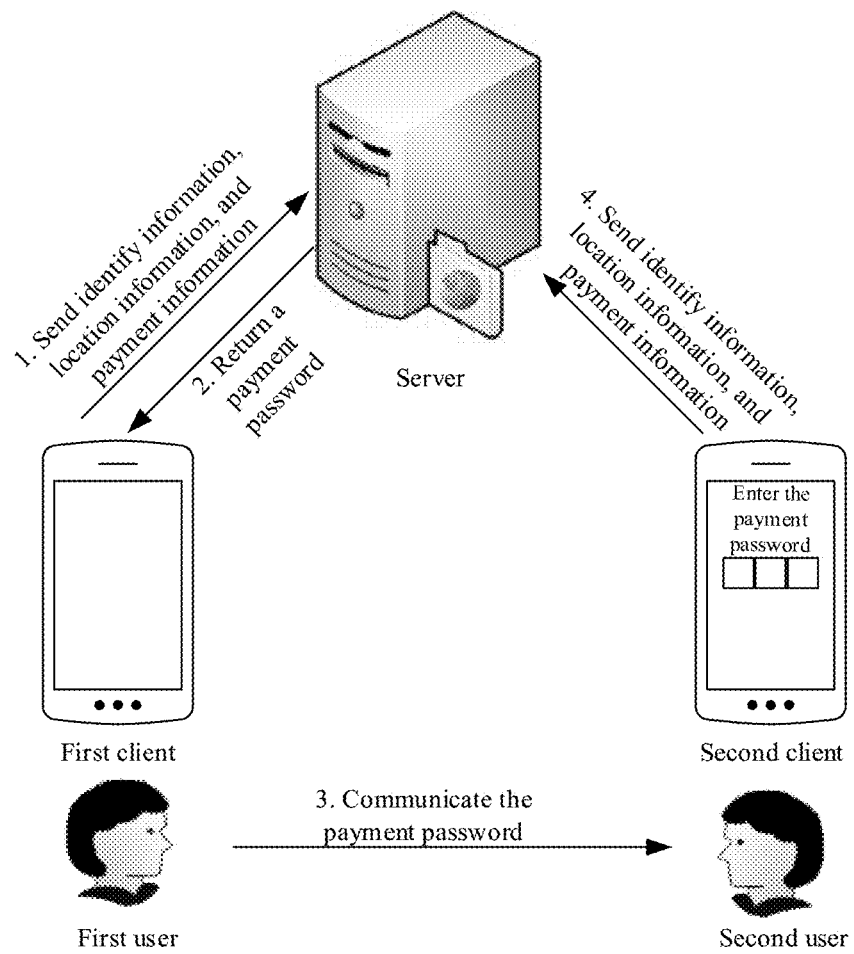
FIG. 1 is a schematic diagram illustrating a system architecture according to an implementation of the present specification.

FIG. 1 is a schematic diagram illustrating a system architecture according to an implementation of the present specification. In the implementations of the present specification, the payment scheme can use an architecture shown in FIG. 1. In the architecture, the terminal device of a user can be an electronic device that can be used for mobile payment, such as a smartphone, a tablet computer, etc.

It worthwhile to note that, in the architecture, the first user and the second user are relatively concepts, e.g., when the first user is a payer, the second user is a payee; or when the first user is a payee, the second user is a payer.

Figure 2:
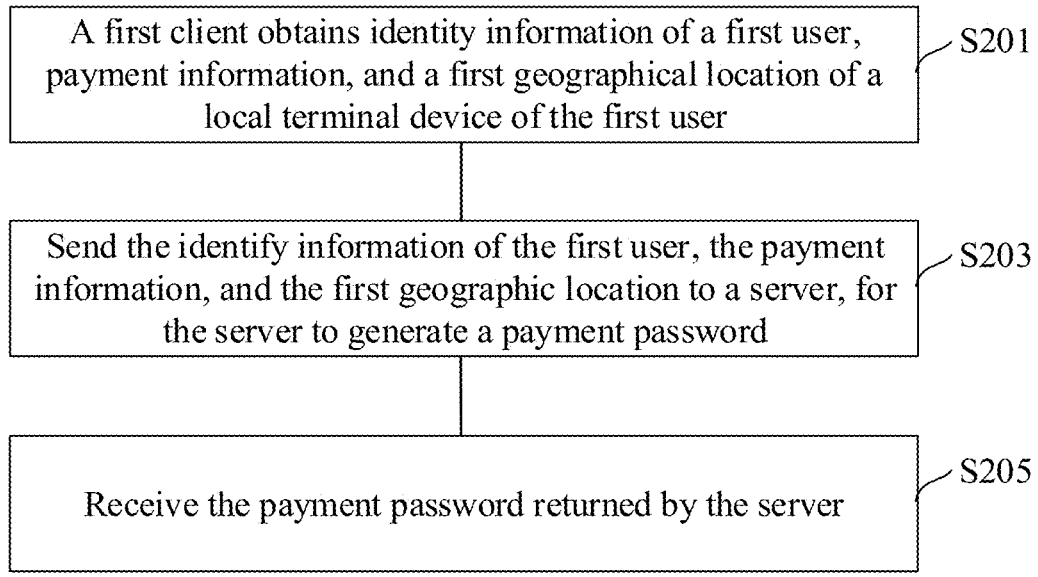
FIG. 2 is a schematic diagram illustrating a flowchart of a first client according to an implementation of the present specification.

The following describes in detail the payment process provided in implementations of the present specification based on the architecture shown in FIG. 1. The process specifically includes three aspects: aspect of a first client, aspect of a second client, and aspect of a server. For the aspect of a first client, FIG. 2 is a schematic diagram illustrating a flowchart of a first client according to an implementation of the present specification, including:

S201. A first client obtains identity information of a first user, payment information, and a first geographical location of a local terminal device of the first user.

The identification information of the first user can be identity information such as a telephone number, a client login account, an ID card number, etc. Generally, when the first user logs in to a client, the identity information is automatically recorded or pre-stored in the local terminal device, and is directly extracted. The payment information can include information such as a payment amount, a payment time, an order number, etc., and can be obtained based on an instruction entered by the first user. The first geographical location can be provided by a positioning module included in the terminal device of the first user. The positioning module may be a handset-based positioning module, a network-based positioning module and/or a hybrid positioning module that uses a combination of network-based and handset-based technologies for location determination. For example, specific location information is provided by a satellite-based positioning system, e.g., the Global Positioning System (GPS) or the global navigation satellite system (GNSS), that is included in a mobile device, or the location information is provided through network-based positioning, e.g., by service provider's network infrastructure like base stations of a location based service (LBS). A client application installed in the terminal device may also provide other handset-based positioning, e.g., by detecting the cell identification, signal strength of the home and neighboring cells. Other positioning techniques are also possible to determine the geographic location of the terminal device, like SIM-based positioning, WI-FI based positioning, other indoor positioning techniques, and hybrid positioning systems. The geographic location of a terminal device may be obtained directly by the terminal device or may be obtained by a service provider, e.g., a telecommunication carrier company, which may provide it to the terminal device, to the client, or to a server of the payment system.

S203. Send the identification information of the first user, the payment information, and the first geographical location to a server, for the server to generate a payment password.

Payment passwords produced by the server can be in a variety of forms, including: a numeric string, for example, "123666"; a character string, for example, "a1b2c$", and a natural language text, for example, "payment collection in a store", etc. Clearly, in practice, passwords are in various forms. Only a few relatively common forms of passwords are listed above. As long as the method of using the payment password is the same as that provided in the implementations of the present specification, the method falls within the protection scope of the present application, regardless of the form of the payment password.

S205. Receive the payment password returned by the server.

Figure 3:
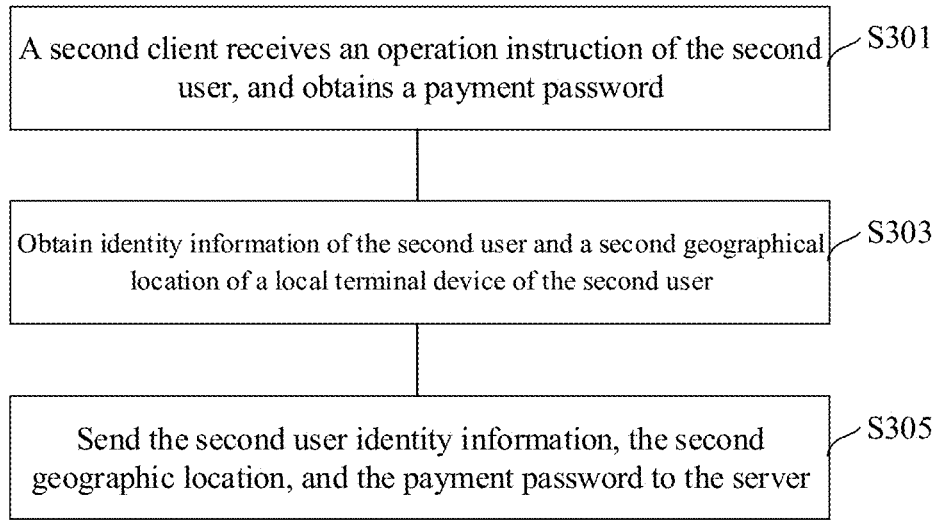
FIG. 3 is a schematic diagram illustrating a flowchart of a second client according to an implementation of the present specification.

After the first client receives the payment password, offline face-to-face payment can be made. For example, the first user can directly forward the payment password, for example, verbally, or forwarding using communication software, to a second user of a second client. Therefore, for the aspect of the second client, in the payment process described in the implementation of the present specification, the following steps are specifically included. FIG. 3 is a schematic diagram illustrating a flowchart of a second client according to an implementation of the present specification, including:

S301. A second client receives an operation instruction of the second user, and obtains a payment password, where the payment password is generated by a server and sent to a first client. For example, the first user verbally conveys the payment password to the second user; and in this case, the operation instruction of the second user can be a manual input of the characters or numbers included in the payment password sequentially. For another example, after receiving the payment password, the first user forwards the payment password to the second user through the communication software, and in this case, the second user can perform operations such as copy/paste or clipping in the communication software to obtain the payment password and input the payment password to the second client. In some implementations, the second client directly obtains the payment password from the first client upon user instructions. The transfer of the payment password from the first client to the second client may be conducted without human interference to enhance data security. In some implementations, the payment password may be encrypted by the first client before being forwarded, displayed or shared to the second user. The encrypted payment password may be decrypted by the second client, without human interference, or by the server.

S303. Obtain identity information of the second user and a second geographical location of a local terminal device of the second user.

S305. Send the identification information of the second user, the second geographic location, and the payment password to the server.

The forms and acquisition modes of the identification information of the second user and the second geographical location are the same as those of the identification information of the first user and the first geographical location. Details are omitted here for simplicity.

It is worthwhile to note that both the first client and the second client can automatically obtain the identity information of a user and the geographical location in the background without manual operation by the respective user, which improves the user experience. Manual operations are required only when the second user enters the payment password to complete the entire payment flow.

Figure 4:
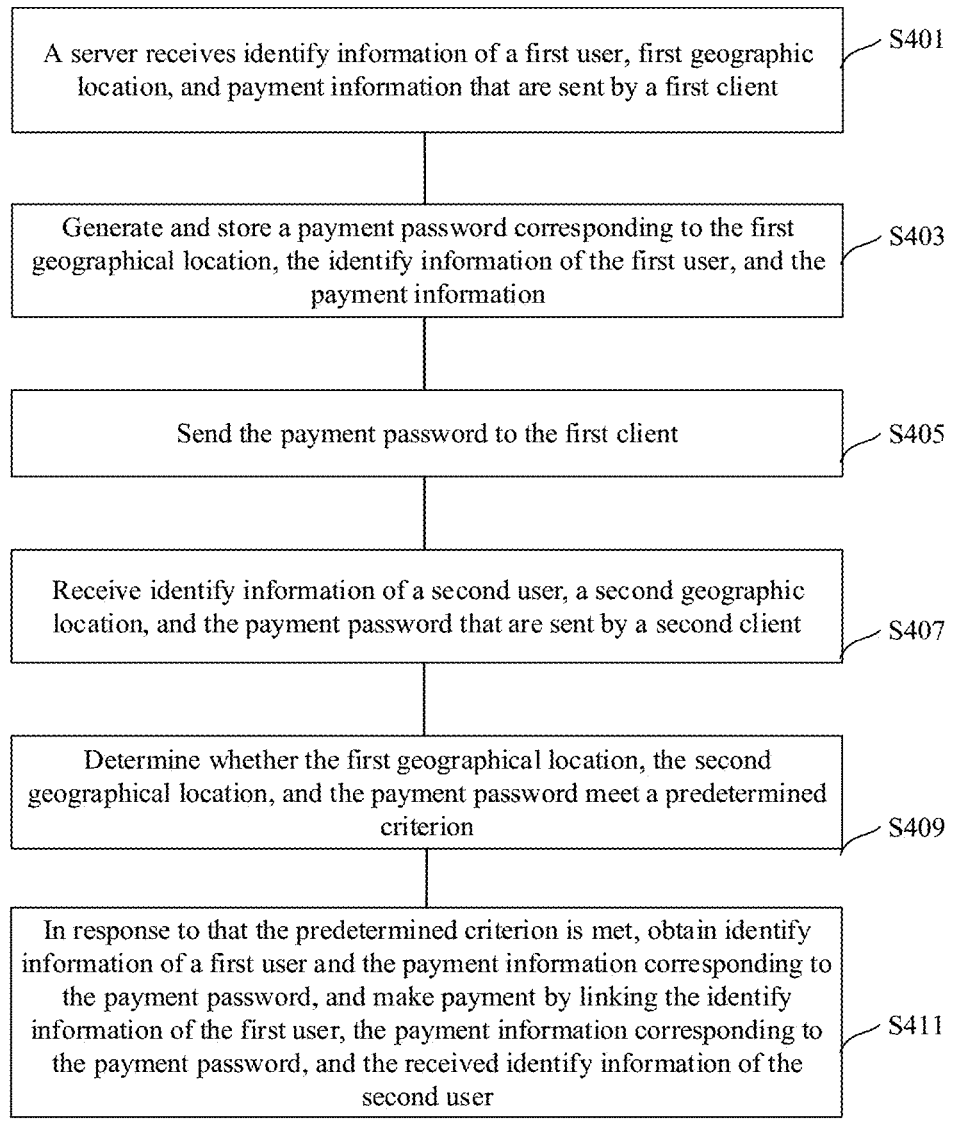
FIG. 4 is a schematic diagram illustrating a flowchart of a server according to an implementation of the present specification.

For the aspect of the server in the payment process described in the implementations of the present specification, the following steps are specifically included. FIG. 4 is a schematic diagram illustrating a flowchart of a server according to an implementation of the present specification, including:

S401. A server receives identification information of a first user, first geographic location, and payment information that are sent by a first client.

S403. Generate and store a payment password corresponding to the first geographical location, the identification information of the first user, and the payment information.

The payment password can be generated based on the first geographic location, the identification information of the first user, and the payment information. Further, the payment password can be generated in a decodable way. Alternatively, the generated payment password can be independent of the first geographical location, the identification information of the first user, and the payment information in the generation process (for example, a payment password with a certain sequence number is given based on the generation time), but a correspondence between the payment password and the first geographical location, the identification information of the first user, and the payment information is established after the payment password is generated, for example, the correspondence between the payment password and the first geographical location, the identification information of the first user, and the payment information is established in the form of a key-value pair, the payment password being a key, and stored in the server for query.

S405. Send the payment password to the first client.

S407. Receive identification information of a second user, a second geographic location, and the payment password that are sent by a second client.

S409. Determine whether the first geographical location, the second geographical location, and the payment password meet determined criterion, e.g., a determined or a dynamically determined criterion.

Here, the determined criterion can be that the first geographical location and the second geographical location corresponding to the same payment password are within a certain distance range; or the second geographical location can be taken as a center point, and whether the server side has stored the same payment password is queried or matched within a specified range around the center point. The specific approach of determining the criteria may depend on the way in which the payment password is generated.

S411. In response to the determined criterion being met, obtaining identification information of a first user and the payment information corresponding to the payment password, and making payment by linking the identification information of the first user, the payment information corresponding to the payment password, and the received identification information of the second user.

It is worthwhile to note that the payment can be a collection or a payment, which can be implemented using determined service logic, e.g., predetermined or dynamically determined.

According to the solution described in this implementation of the present specification, during face-to-face payment, the terminal device of the first user identifies the location of the first user, and then sends location information and the payment information to the server; and the server generates a corresponding payment password and returns the corresponding payment password to the first user. Then, the first user forwards the payment password to the second user (for example, verbal communication, or forwarding using communication software, etc.), and the second user uploads his own location and the payment password to the server, and then the server matches or queries whether the same payment password relates to a user located within a certain range around the location of the second user. If the matching or query is successful, payment is made. According to the above solution, a payment method different from a code scanning payment is provided, which enriches a user's choices in making a payment face-to-face, and improves user experience.

As a specific implementation, the payment passwords of the first client, the second client, and the server in the above solution can be in a form of a numeric string, a character string, or a natural language text.

In practice, the determining whether the first geographical location, the second geographical location, and the payment password meet the determined criterion in S409 can be implemented as follows: querying whether there is a matching payment password within a specified distance range around the second geographical location.

For example, for GPS information uploaded by the first user, the server labels its location as A, generates a payment instruction 1234666, establishes a correspondence (A, 1234666), and stores the correspondence; then, the GPS information (labeled B) and the payment password 1234666 uploaded by the second user are received, and then other geographical locations within the range of L meters with B as the center are obtained, and whether the obtained geographical locations have the corresponding payment password 1234666 are queried; and finally, A is obtained.

As a specific implementation, the generating and storing the payment password corresponding to the first geographical location, the identification information of the first user, and the payment information in S403 can be implemented as follows: generating the payment password including the first geographical location, the identification information of the first user, and the payment information using the first geographical location, the identification information of the first user, and the payment information as a password seed.

For example, the payment password=genCode (the identification information of the first user, the first geographical location, the payment information, an offset), where the offset can be a random factor such as a system time, to improve security. In this process, if the payment password is generated using a reversely decodable algorithm, the payment password can further include the corresponding identification information of a first user, first geographical location, and payment information. Therefore, in this implementation, the determining whether the first geographical location, the second geographical location, and the payment password meet the determined criterion in S409 can be implemented as follows: decoding the payment password, obtaining the first geographical location included in the payment password, and determining whether the first geographical location obtained through the decoding and the second geographical location are within a specified distance range.

Figure 5:
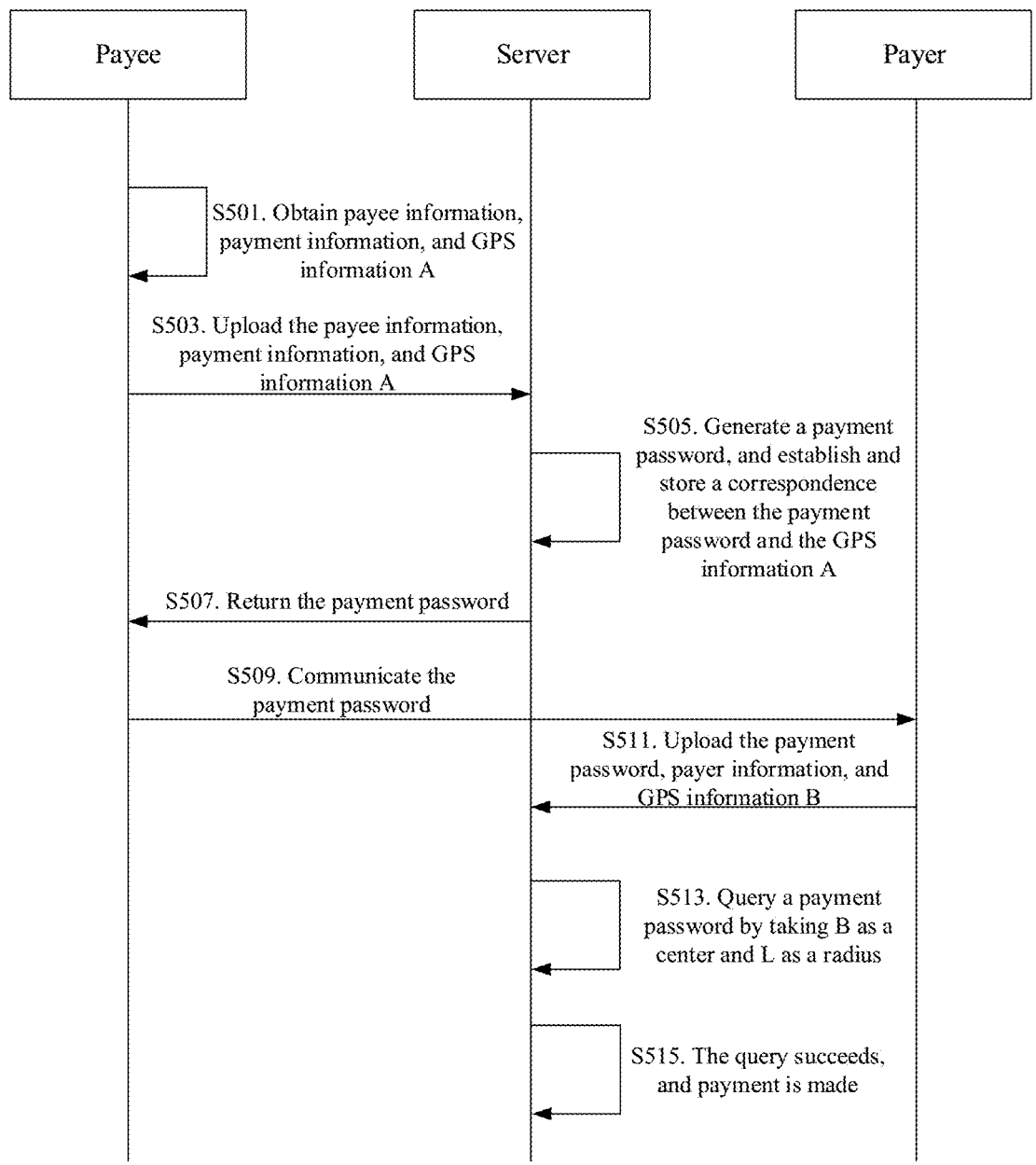
FIG. 5 is a schematic diagram illustrating execution of a three-way payment process according to an implementation of the present specification.

The following describes actual processing in the present specification in practice based on an example in which a first user is a payee and a second user is a payer. FIG. 5 is a schematic diagram illustrating execution of a three-way payment process according to an implementation of the present specification, including:

S501. A payee locally obtains payee information, payment information, and GPS information A.

S503. Upload the payee information, payment information, and GPS information A to the server.

S505. The server generates a payment password, and establishes and stores a correspondence between the payment password and the GPS information A.

S507. Send the payment password to the payee.

S509. The payee communicates the payment password to the payer.

S511. The payer uploads the payment password, payer information, and GPS information B.

S513. The server queries the payment password by taking B as a center and L as a radius.

S515. The query succeeds, and payment user information and the payment information corresponding to the payment password are obtained, and then payment is made.

In the above process, alternatively, the payment can be made by the first user, and the payment can be received by the second user, provided that the identity information of the corresponding payment is correspondingly converted. The overall process is the same as the above process. As such, more payment methods are provided to the user, which enriches user's choices and improves user experience.

Figure 6:
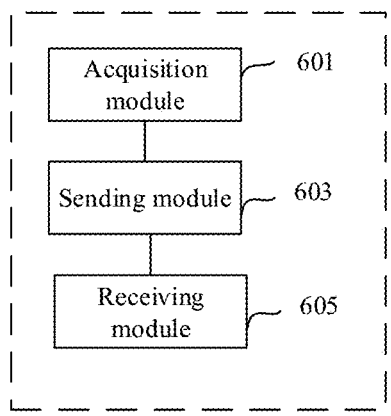
FIG. 6 is a schematic diagram illustrating an apparatus of a first client according to an implementation of the present specification.

Based on the same idea, implementations of the present specification further provide a payment apparatus. FIG. 6 is a schematic diagram illustrating an apparatus of a first client according to this implementation of the present specification. As shown in FIG. 6, the apparatus includes: an acquisition module 601, configured to obtain, by a first client, identification information of a first user, payment information, and a first geographical location of a local terminal device; a sending module 603, configured to send the identification information of the first user, the payment information, and the first geographic location to a server, for the server to generate a payment password; and a receiving module 605, configured to receive the payment password returned by the server.

Figure 7:
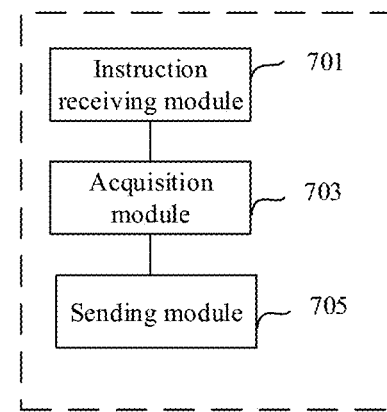
FIG. 7 is a schematic diagram illustrating an apparatus of a second client according to an implementation of the present specification.

In addition, implementations of the present specification further provide another payment apparatus. FIG. 7 is a schematic diagram illustrating an apparatus of a second client according to this implementation of the present specification. As shown in FIG. 7, the apparatus includes: an instruction receiving module 701, configured to receive, by a second client, an operation instruction of the user, and obtain a payment password, where the payment password is generated by a server and sent to a first client; an acquisition module 703, configured to obtain identification information of a second user and a second geographical location of a local terminal device of the second user; and a sending module 705, configured to send the identification information of the second user, the second geographic location, and the payment password to the server.

Figure 8:
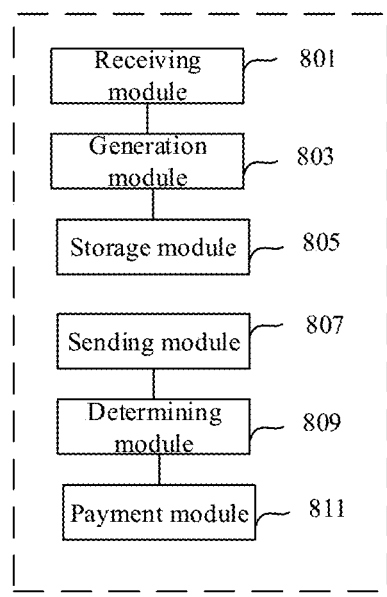
FIG. 8 is a schematic diagram illustrating an apparatus of a server according to an implementation of the present specification.

In addition, implementations of the present specification further provide still another payment apparatus. FIG. 8 is a schematic diagram illustrating an apparatus of a server according to this implementation of the present specification. As shown in FIG. 8, the apparatus includes: a receiving module 801, configured to receive, by a server, identification information of a first user, first geographic location, and payment information that are sent by a first client; a generation module 803, configured to generate and store a payment password corresponding to the first geographical location, the identification information of the first user, and the payment information; a storage module 805, configured to a correspondence between the first geographical location, the identification information of the first user, the payment information, and the payment password; a sending module 807, configured to send the payment password to the first client, where the receiving module 801 is further configured to receive identification information of a second user, a second geographic location, and the payment password that are sent by a second client; a determining module 809, configured to determine whether the first geographical location, the second geographical location, and the payment password meet a determined criterion; and a payment module 811, configured to: in response to the determined criterion being met, obtain identification information of a first user and the payment information corresponding to the payment password, and make payment by linking the identification information of the first user, the payment information corresponding to the payment password, and the received identification information of the second user.

Further, the payment password includes a numeric string, a character string, or a natural language text.

Further, the determining module 809 is configured to query whether there is a matching payment password within a specified distance range around the second geographical location.

Further, the generation module 803 is configured to generate the payment password including the first geographical location, the identification information of the first user, and the payment information using the first geographical location, the identification information of the first user, and the payment information as a password seed; and the determining module 809 is configured to decode the payment password, obtain the first geographical location included in the payment password, and determine whether the first geographical location obtained through the decoding and the second geographical location are within a specified distance range.

Correspondingly, implementations of the present specification further provide a payment device, including: a memory, configured to store a payment program; and a processor, configured to invoke the payment program in the memory to perform the following operations: obtaining, by a first client, identification information of a first user, payment information, and a first geographical location of a local terminal device; send the identification information of the first user, the payment information, and the first geographic location to a server, for the server to generate a payment password; and receive the payment password returned by the server.

In addition, implementations of the present specification further provide another payment device, including: a memory, configured to store a payment program; and a processor, configured to invoke the payment program in the memory to perform the following operations: receiving, by a second client, an operation instruction of the user, and obtaining a payment password, where the payment password is generated by a server and sent to a first client; obtaining identification information of a second user and a second geographical location of a local terminal device of the second user; and sending the identification information of the second user, the second geographic location, and the payment password to the server.

In addition, implementations of the present specification further provide still another payment device, including: a memory, configured to store a payment program; and a processor, configured to invoke the payment program in the memory to perform the following operations: receiving, by a server, identification information of a first user, first geographic location, and payment information that are sent by a first client; generate and store a payment password corresponding to the first geographical location, the identification information of the first user, and the payment information; send the payment password to the first client; receive identification information of a second user, a second geographic location, and the payment password that are sent by a second client; determine whether the first geographical location, the second geographical location, and the payment password meet a determined criterion; and in response to the determined criterion being met, obtain identification information of a first user and the payment information corresponding to the payment password, and make payment by linking the identification information of the first user, the payment information corresponding to the payment password, and the received identification information of the second user.

Based on the same idea, implementations of the present specification further provide a non-volatile computer storage medium, where the storage medium stores computer executable instructions that are used to: obtain, by a first client, identification information of a first user, payment information, and a first geographical location of a local terminal device; send the identification information of the first user, the payment information, and the first geographic location to a server, for the server to generate a payment password; and receive the payment password returned by the server.

In addition, implementations of the present specification further provide another non-volatile computer storage medium, where the storage medium stores computer executable instructions that are used to: receive, by a second client, an operation instruction of the user, and obtain a payment password, where the payment password is generated by a server and sent to a first client; obtain identification information of a second user and a second geographical location of a local terminal device of the second user; and send the identification information of the second user, the second geographic location, and the payment password to the server.

In addition, implementations of the present specification further provide another non-volatile computer storage medium, where the storage medium stores computer executable instructions that are used to: receive, by a server, identification information of a first user, first geographic location, and payment information that are sent by a first client; generate and store a payment password corresponding to the first geographical location, the identification information of the first user, and the payment information; send the payment password to the first client; receive identification information of a second user, a second geographic location, and the payment password that are sent by a second client; determine whether the first geographical location, the second geographical location, and the payment password meet a determined criterion; and in response to the determined criterion being met, obtain identification information of a first user and the payment information corresponding to the payment password, and make payment by linking the identification information of the first user, the payment information corresponding to the payment password, and the received identification information of the second user.

The implementations of the present specification are described in a progressive way. For same or similar parts of the implementations, mutual references can be made to the implementations. Each implementation focuses on a difference from the other implementations. Particularly, apparatus, device, and medium implementations are basically similar to a method implementation, and therefore are described briefly. For related parts, references can be made to related descriptions in the method implementation. Details are omitted here for simplicity.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

In the 1990s, whether technology improvement was a hardware improvement (for example, improvement of a circuit structure, such as a diode, a transistor, or a switch) or software improvement (improvement of a method procedure) could be clearly distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed using the several described hardware description languages and is programmed into an integrated circuit.

A controller can be implemented using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicon Labs C8051F320. The memory controller can also be implemented as a part of the control logic of the memory. A person skilled in the art also knows that, in addition to implementing the controller using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

The system, device, module, or unit illustrated in the previous implementations can be implemented using a computer chip or an entity, or can be implemented using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above devices are described separately in terms of their functions. Certainly, functions of the units can be implemented in the same or different software or hardware when the present specification is implemented.

A person skilled in the art should understand that the implementations of the present specification can be provided as methods, systems, or computer program products. Therefore, the present specification can take a form of complete hardware implementations, complete software implementations, or implementations combining software and hardware. Further, the present specification can take a form of a computer program product implemented on one or more computer-usable storage media (including but not limited to disk storage, CD-ROM, and optical storage) containing computer-usable program code.

The present specification is described with reference to the flowcharts and/or block diagrams of the method, the device (system), and the computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It is also worthwhile to note that terms "include", "include" or any other variant is intended to cover non-exclusive inclusion, so that processes, methods, commodities or devices that include a series of elements include not only those elements but also other elements that are not explicitly listed, or elements inherent in such processes, methods, commodities or devices. An element described by "includes a . . . " further includes, without more constraints, another identical element in the process, method, product, or device that includes the element.

A person skilled in the art should understand that one or more implementations of the present specification can be provided as a method, a system, or a computer program product. Therefore, the implementations of the present specification can take a form of hardware implementations, software implementations, or both. Further, the implementations of the present specification can take a form of computer program products implemented on one or more computer-usable storage media (including but not limited to a disk storage device, CD-ROM, and an optical storage device) containing computer-usable program code.

The implementations of the present specification can be described in the general context of computer executable instructions executed by a computer, for example, a program module. Generally, the program module includes a routine, a program, an object, a component, a data structure, etc. executing a specific task or implementing a specific abstract data type. The implementations of the present specification can also be practiced in distributed computing environments. In the distributed computing environments, tasks are performed by remote processing devices connected through a communications network. In a distributed computing environment, the program module can be located in both local and remote computer storage media including storage devices.

What is claimed is:

1. A method, comprising:
  providing computer executable instructions to implement a first client, a second client and a sever;
  wherein the computer executable instructions, when executed by one or more processors, enable the one or more processors to conduct acts including:
  at the first client,
    obtaining identification information of a first user, payment information, and a first geographical location of a first terminal device that is used to access the first client;
    sending the identification information of the first user, the payment information, and the first geographical location to a server for the server to generate a payment password; and
    receiving the payment password returned by the server;
  at the second client,
    obtaining the payment password from the first client;
    obtaining identification information of a second user, payment information, and a second geographical location of a second terminal device that is used to access the second client;
    sending the identification information of the second user, the payment password, and the second geographical location to the server; and
  at the server,
    receiving, from the first client, the identification information of the first user, the payment information, and the first geographical location;
    encoding the identification information of the first user, the first geographical location, and the payment information using a first algorithm to generate a payment password;
    sending the payment password to the first client;
    receiving, from the second client, the identification information of the second user, the payment password, and the second geographical location;
    decoding the payment password received from the second client using a second algorithm that corresponds to the first algorithm to obtain the identification information of the first user, the first geographical location, and the payment information;
    determining that a distance between the first geographical location obtained from the decoding and the second geographical location meets a threshold distance; and
    executing a payment operation between the first user and the second user according to the payment information in response to the determining that the distance between the first geographical location and the second geographical location meets the threshold distance.

2. The method of claim 1, wherein the first geographical location is automatically detected by a positioning module of the first terminal device.

3. The method of claim 2, wherein the positioning module includes one or more of a handset-based positioning module and a network-based positioning module.

4. The method of claim 1, comprising:
  at the first client,
    encrypting the payment password; and
    transmitting the encrypted payment password to the second client; and
  at the second client,
    decrypting the encrypted payment password to obtain the payment password.

5. The method of claim 1, comprising:
  at the first client, displaying the payment password on a display device of the first terminal device.

6. A method, comprising:
  at a server,
    receiving, from a first client, payment information and a first geographical location of a terminal device that is used to access the first client;
    encoding the first geographical location and the payment information using a first algorithm to generate a payment password corresponding to the first geographical location and the payment information;
    sending the payment password to the first client;
    receiving, from a second client, the payment password and a second geographical location of a terminal device that is used to access the second client;
    decoding the payment password received from the second client using a second algorithm that corresponds to the first algorithm to obtain the payment information and the first geographical location;
    determining that a distance between the first geographical location obtained from the decoding and the second geographical location meets a threshold distance; and
    executing a payment operation according to the payment information in response to the determining that the distance between the first geographical location and the second geographical location meets the threshold distance.

7. The method according to claim 6, comprising:
  receiving identification information of a first user sent by the first client;
  receiving identification information of a second user sent by the second client; and
  wherein the executing the payment operation includes linking the identification information of the first user, the identification information of the second user and the payment information.

8. The method according to claim 6, wherein the payment password comprises one or more of a numeric string, a character string, and a natural language text.

9. The method according to claim 6, wherein the determining that the distance between the first geographical location and the second geographical location meets the threshold distance includes:
querying whether there is a matching payment password within the threshold distance from the second geographical location.

10. The method of claim 6, wherein the payment password conceals the first geographic location.

11. The method of claim 6, wherein the threshold distance is determined as a distance for a face-to-face interaction between users of the first client and the second client.

12. The method of claim 6, wherein the encoding the payment information and the first geographic location includes encoding the payment information and the first geographic location with a random factor.

13. A system, comprising:
a server including a processor and a memory device storing executable instructions, wherein the processor executes the executable instructions to:
receive, from a first client, payment information and a first geographical location of a first terminal device that is used to access the first client;
encode the payment information and the first geographic location received from the first client using a first algorithm to generate a payment password corresponding to the first geographical location and the payment information;
send the payment password to the first client;
receive, from a second client, the payment password and a second geographical location of a second terminal device used to access the second client;
decode the payment password received from the second client using a second algorithm corresponding to the first algorithm to obtain the first geographic location and the payment information;
determine that a distance between the first geographical location and the second geographical location meets a threshold distance; and
in response to that the distance between the first geographical location obtained from the decoding and the second geographical location meets the threshold distance, execute a payment operation according to the payment information obtained from the decoding.

14. The system according to claim 13, wherein the payment password comprises one or more of a numeric string, a character string, and a natural language text.

15. The system according to claim 13, wherein the determining that the distance between the first geographical location and the second geographical location meets the threshold distance includes querying whether there is a matching payment password within the threshold distance from the second geographical location.

16. The system according to claim 13, comprising:
the first client including a processor and a memory device storing executable instructions, wherein the processor executes the executable instructions to:
obtain the payment information and the first geographical location of the first terminal device;
send the payment information and the first geographical location to the server; and
receive the payment password returned by the server.

17. The system according to claim 13, comprising:
the second client including a processor and a memory device storing executable instructions, wherein the processor executes the executable instructions to:
obtain the payment password;
obtain the second geographical location of the second terminal device; and
send the second geographical location and the obtained payment password to the server.

18. The system of claim 17, wherein the second client obtains the payment password from a user input or from the first client upon a user instruction.

19. The system of claim 17, wherein the second client automatically obtains the second geographic location without interference by the second user.

20. A device, comprising:
a memory, storing a payment program of executable instructions; and
a processor, operable to execute the instructions of the payment program to perform following acts:
at a server,
receiving, from a first client, payment information and a first geographical location of a terminal device that is used to access the first client;
encoding the payment information and the first geographic location using a first algorithm to generate a payment password corresponding to the first geographical location and the payment information;
sending the payment password to the first client;
receiving, from a second client, the payment password and a second geographical location of a terminal device that is used to access the second client;
decoding the payment password received from the second client using a second algorithm corresponding to the first algorithm to obtain the payment information and the first geographic location;
determining that a distance between the first geographical location obtained from the decoding and the second geographical location meets a threshold distance; and
in response to the determining that the distance between the first geographical location and the second geographical location meets the threshold distance, executing a payment operation according to the payment information.

* * * * *